US012389147B2

(12) United States Patent
Girotti et al.

(10) Patent No.: US 12,389,147 B2
(45) Date of Patent: Aug. 12, 2025

(54) LOUDSPEAKER AND HOUSING CONFIGURATION

(71) Applicants: Luca Girotti, Morrovalle (IT); Pietro Pantaleone, Potenza Picena (IT)

(72) Inventors: Luca Girotti, Morrovalle (IT); Pietro Pantaleone, Potenza Picena (IT)

(73) Assignee: Elettromedia s.p.a., Potenza Picena (IT)

( * ) Notice: Subject to any disclaimer, the term of this patent is extended or adjusted under 35 U.S.C. 154(b) by 229 days.

(21) Appl. No.: 18/336,591

(22) Filed: Jun. 16, 2023

(65) Prior Publication Data

US 2024/0422463 A1 Dec. 19, 2024

(51) Int. Cl.
*H04R 1/02* (2006.01)
*H04R 9/02* (2006.01)

(52) U.S. Cl.
CPC ............. *H04R 1/028* (2013.01); *H04R 9/025* (2013.01)

(58) Field of Classification Search
CPC ......... H04R 1/028; H04R 9/025; H04R 1/023
See application file for complete search history.

(56) References Cited

U.S. PATENT DOCUMENTS 4,256,930 A * 3/1981 Garner ..................... H04R 1/24 381/340
8,831,270 B1 * 9/2014 Dimitrov ................. H04R 1/30 381/401
9,084,056 B2 * 7/2015 Flavignard ............... H04R 1/30
10,506,331 B2 * 12/2019 Baird ....................... H04R 9/06
12,047,733 B1 * 7/2024 Ren .......................... H04R 1/24
12,156,008 B2 * 11/2024 Ren .......................... H04R 1/24
2005/0175209 A1 * 8/2005 Powers .................. H04R 1/028 381/355
2008/0143495 A1 * 6/2008 Haase ....................... F21K 9/00 340/815.69
2015/0237449 A1 * 8/2015 Papp ........................ H04R 7/02 381/398
2016/0052017 A1 * 2/2016 Weber .................... H04R 1/023 156/60
2020/0363054 A1 * 11/2020 Wilson .................. F21S 10/023
2024/0080594 A1 * 3/2024 Williamson ............. H04R 5/02
2024/0187769 A1 * 6/2024 Jepsen .................... F21V 14/08
2024/0284092 A1 * 8/2024 Linghu .................. H04R 9/063

* cited by examiner

*Primary Examiner* — Oyesola C Ojo
(74) *Attorney, Agent, or Firm* — LADAS & PARRY LLP

(57) ABSTRACT

A loudspeaker system includes a housing, a coaxial loudspeaker driver, and illuminating elements wherein at least one of the illuminating elements, for example a front light diffuser, is sufficiently robust to carry the weight of the coaxial loudspeaker driver. The entire structure is constructed in such a way to prevent water or air leakages. The coaxial loudspeaker driver has a single magnetic assembly with a first axial annular air gap for the low-frequency moving coil and a second annular air gap for the high-frequency moving coil. The loudspeaker driver is supported and maintained in position within the housing by at least one illuminating element. The housing is provided with a water proof light and sound-transmitting front grille and a water proof light and sound transmitting rear cap. The loudspeaker driver and illuminating elements are dimensioned to fit tightly within the housing.

5 Claims, 3 Drawing Sheets

200

LOUDSPEAKER AND HOUSING CONFIGURATION

FIELD OF INVENTION

The present invention relates to loudspeaker lighting and housing configurations including a coaxial loudspeaker driver where the inner structure of the housing and of the coaxial loudspeaker driver are protected from splashing water and other external particles.

DESCRIPTION OF THE RELATED ART

Marine sound systems may be exposed to splashing water and other impacting external particles. Existing loudspeaker configurations address several issues, but do not introduce elements for protecting the inner structure of the loudspeaker driver.

U.S. Pat. No. 10,924,844 describes a double concentric horn to achieve better sound output and clarity over distance. U.S. Pat. No. 10,841,689 describes a housing with a three-way coaxial loudspeaker driver where the central axis of the driver offset from the central axis of the housing to improve directionality. U.S. Pat. No. 11,149,939 describes a housing for a loudspeaker unit that may be selectively illuminated to enhance decorative effect.

BRIEF SUMMARY OF THE INVENTION

Disclosed and claimed here is a loudspeaker and housing configuration. A loudspeaker system includes a housing, a coaxial loudspeaker driver, and illuminating elements wherein at least one of the illuminating elements, for example a front light diffuser, is sufficiently robust to carry the weight of the coaxial loudspeaker driver. The entire structure is constructed in such a way to prevent water or air leakages.

The coaxial loudspeaker driver is a coaxial moving coil loudspeaker having a single magnetic assembly with a first axial annular air gap for the low-frequency moving coil and a second annular air gap for the high-frequency moving coil. A central yoke is formed in such a way to define an internal axial air passage. A low-frequency diaphragm provides an internal axial air passage as a continuation for the yoke's air passage. The air passage from the input section of the yoke's air passage to the outer section of the diaphragm's air passage defines a horn. A cap fixed on the low frequency diaphragm enables the output of acoustic energy through the horn while preventing water and other particles from entering the first annular air gap and the magnetic assembly.

Other aspects, features, and techniques will be apparent to one skilled in the relevant art in view of the following detailed description.

DETAILED DESCRIPTION OF THE INVENTION

Figure 1:
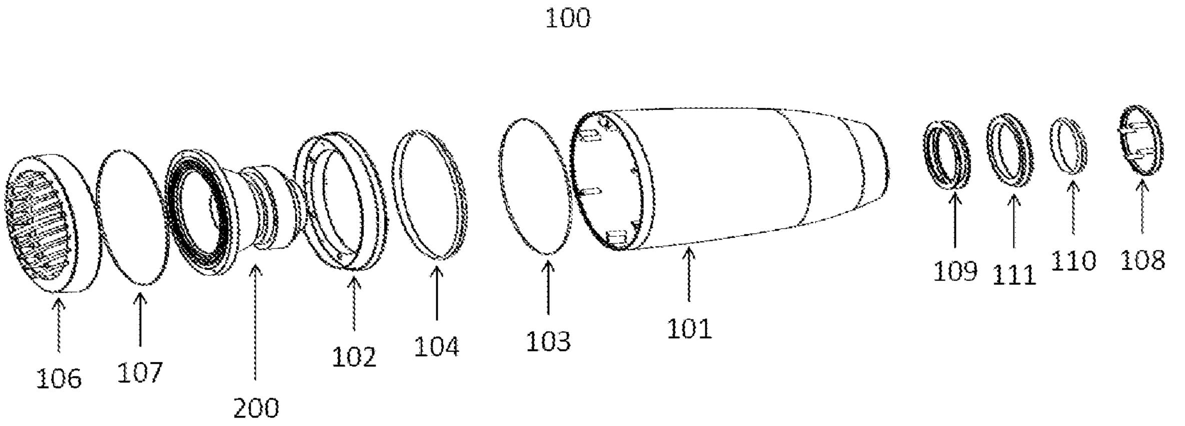
FIG. 1 depicts the exploded view of a loudspeaker and housing configuration according to the implementation of the disclosure.

The present disclosure generally pertains to systems for providing sound and light. The sound system includes a coaxial moving coil loudspeaker driver to achieve higher sound output and more controlled directionality than conventional loudspeaker arrangements, which may emit sound in an unfocused and less efficient manner. The lighting system includes one or two illuminating elements to achieve a decorative effect. Each such illuminating element is conveniently formed by a combination of an LED strip and a light diffuser although other forms of illumination such as CFL bulbs may be used in some situations. When two illuminating elements are used, it is convenient for one such element to be collocated with the coaxial loudspeaker driver and the other to be located to the rear of the coaxial loudspeaker driver.

The sound system and the lighting system are fixed within the housing, in such a way to: provide an air tight volume defined by the hollow cavity of the housing and the rear surface of the coaxial loudspeaker driver, said volume defining an acoustic load for the low frequency diaphragm; and prevent water and other particles from entering the magnetic assembly. Air and water tightness are achieved by arrangement of the components within the housing in such manner that use of gaskets or interlocking connections between the housing and front and rear elements, such as a front grille and a rear cap, and location of gaskets between components within the housing can achieve the desired objective.

Conveniently the illuminating elements, the front grille, the housing and the rear cap, are dimensioned and shaped such that gaskets can be located between the front illuminating element and the front grille, between the front illuminating element and the housing and also, in case of two illuminating elements, between the rear illuminating element, the rear cap and the housing.

Typically, the loudspeaker driver comprises a pair of coaxial voice coils operating in air gaps within the driver structure, one of which drives a cone for lower frequencies and is located on one side of an annular magnet and the other drives a high frequency diaphragm which is located on the second side of the annular magnet.

Advantageously, one of the illuminating elements encircles part of the loudspeaker assembly, for example the frame or magnet, and is sufficiently robust that it can bear the weight of the coaxial loudspeaker driver and maintain its position within the housing. For example, this light diffuser may be made of polycarbonate or any other material that may be used to manufacture transparent plates and attached to the frame or other parts of the loudspeaker driver by means of screws or glue. If desired additional support, for example mounted on the housing, may be used to ensure that the loudspeaker driver remains in its correct position within the housing. The assembly within the housing may include gaskets at suitable locations, for example on each side of the loudspeaker driver to optimize the protection against water intrusion into the area surrounding the loudspeaker driver.

The components are so dimensioned as to fit tightly within the housing while providing for the air gaps noted above.

Referring now to the figures, FIG. 1 depicts the exploded view of a loudspeaker and housing. A system 100 includes a housing 101 fixed with a front light diffuser 102 using a plurality of screws and a gasket 103, where a LED strip 104 is fixed with the front light diffuser. A coaxial loudspeaker driver 200 is fixed with the front light diffuser 102 using a plurality of screws. A front grille 106 is fixed with the front light diffuser 102 using a plurality of screws and a gasket 107, said front grille including a plurality of bars to protect the coaxial loudspeaker driver from impacting objects.

A rear cap 108 is fixed with the rear portion of the housing using a plurality of screws and a double gasket 109, where the screws pack together a LED strip 110 and a rear light diffuser 111.

Figure 2:
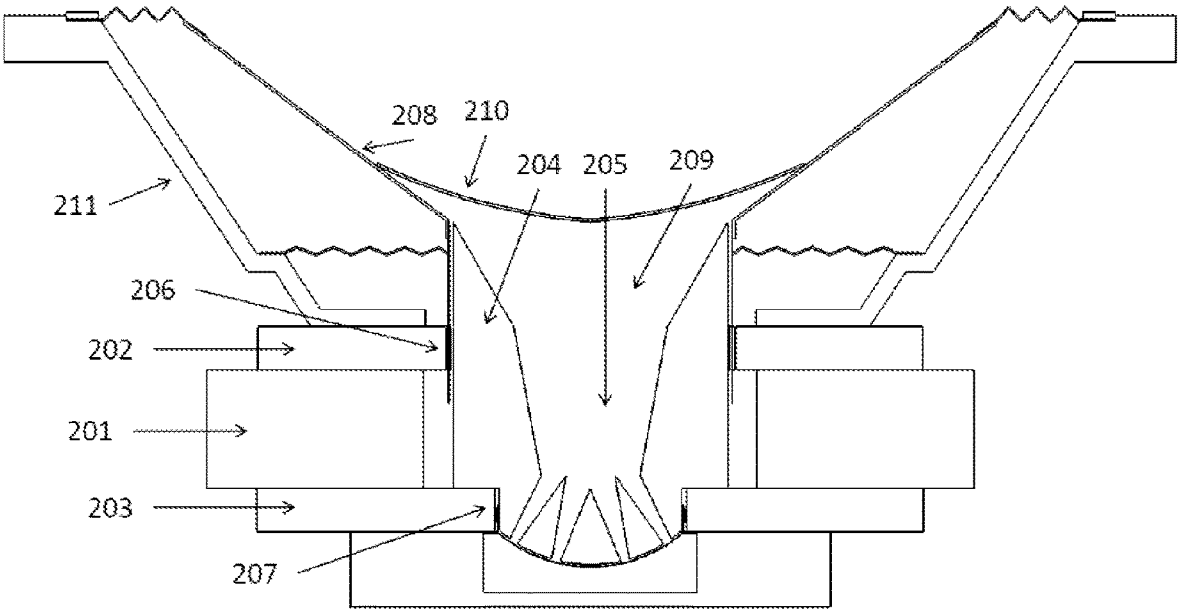
FIG. 2 depicts a cross-section of a coaxial loudspeaker driver according to the implementation of the disclosure.

With reference to FIG. 2, said coaxial loudspeaker driver includes: a common magnetic assembly 200 having an annular magnet 201, a front plate 202, a rear plate 203, a central yoke 204 formed in such a way to define an internal axial air passage 205 where the yoke 204 and the plates form a first annular air gap for the low-frequency moving coil 206 and a second annular air gap for the high-frequency moving coil 207; the low frequency moving coil 206 is connected to a diaphragm 208, said diaphragm formed in such a way to define an internal axial air passage coaxial to the central yoke air passage, said central yoke air passage with said diaphragm air passage forming the internal air volume of an acoustic horn 209; a cap 210 realized with a perforated material which is desirably hydrophobic, for example made of an acrylic. The diaphragm 208 and part of the horn 209 are surrounded by a frame 211 that can be attached to an illuminating element. The horn 209 is preferably treated with a waterproofing material such as epoxy or acrylic. The frame 211 may be made of plastic, steel or aluminum.

Figure 3:
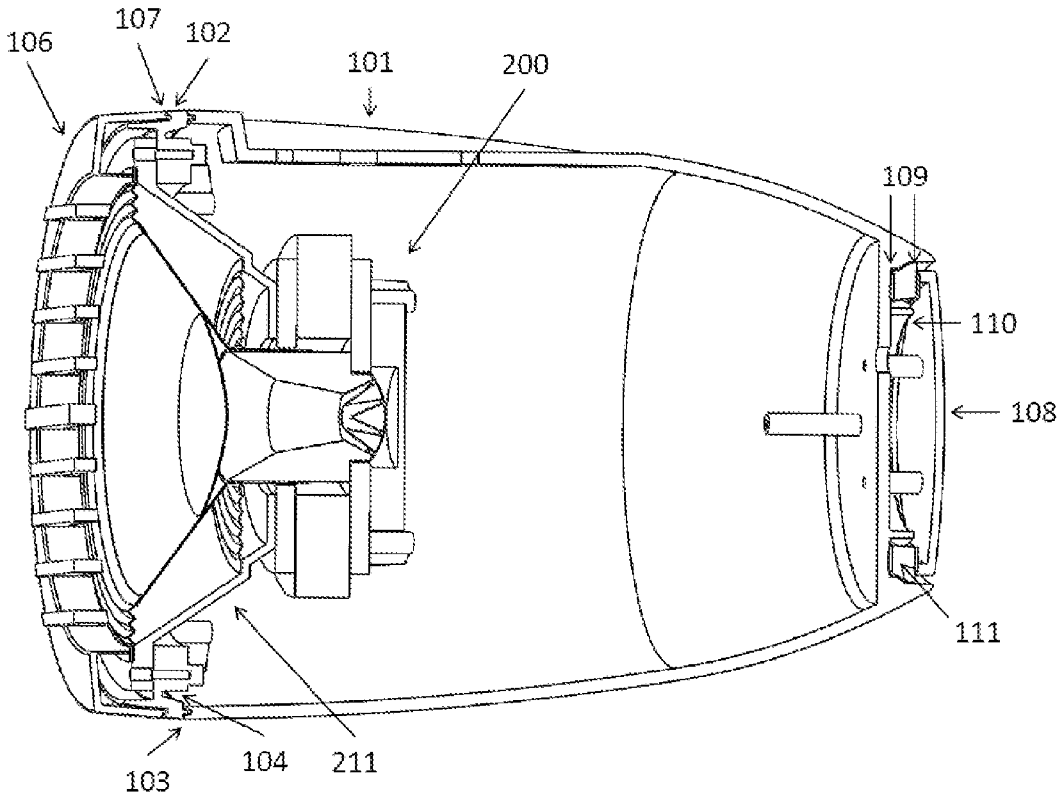
FIG. 3 depicts a longitudinal cross-section of the loudspeaker and lighting elements assembled in a housing.

FIG. 3 shows the cross-sectional view of an assembled loudspeaker, illuminating elements and housing. The parts have the same numbering as in FIGS. 1 and 2. In the embodiment shown, the frame 211 of the loudspeaker driver 200 is attached to the front light diffuser 102 by screws.

Tuning and calibration of the parts may, if desired, permit omission of a non-magnetic spacing ring, as is commonly used from the loudspeaker driver assembly.

What is claimed is:

1. A loudspeaker system comprising a housing containing a coaxial loudspeaker driver, and illuminating elements;

wherein the coaxial loudspeaker driver is a coaxial moving coil loudspeaker having a single magnetic assembly with a first axial annular air gap for a low-frequency moving coil and a second annular air gap for a high-frequency moving coil;

said loudspeaker driver being supported and maintained in position within the housing by at least one illuminating element;

said housing being provided with a water proof light and sound-transmitting front grille and a water proof light and sound transmitting rear cap; and said loudspeaker driver and illuminating elements being dimensioned to fit tightly within the housing;

wherein a front light diffuser is attached to said housing and a LED strip is fixed to the front light diffuser;

a front grille is attached to the front light diffuser, said front grille including a plurality of bars;

a rear cap fixed to the rear portion of the housing using a plurality of screws and a double gasket, where the screws pack together a LED strip and a rear light diffuser with the rear cap; and the coaxial loudspeaker driver is attached to the front light diffuser using a plurality of screws and a gasket.

2. A loudspeaker system as claimed in claim 1 wherein said coaxial loudspeaker driver:

comprises an annular magnet, a central yoke formed in such a way to define an internal axial air passage where the yoke and plates form a first annular air gap for the low-frequency moving coil and a second annular air gap for the high-frequency moving coil said low frequency moving coil being connected to a diaphragm, said diaphragm formed in such a way to define an internal axial air passage coaxial to the central yoke air said central yoke air passage with said diaphragm air passage forming the internal air volume of an acoustic horn; and a second annular air gap for the high-frequency moving coil.

3. A loudspeaker system as claimed in claim 1 wherein said illuminating elements comprise an LED strip and a light diffuser.

4. A loudspeaker system as claimed in claim 1 wherein a part of said loudspeaker driver is mounted within a light diffuser forming part of an illuminating element.

5. A loudspeaker system as claimed in claim 4 wherein said system comprises two illuminating elements and the loudspeaker driver is mounted within the light diffuser of the forward illuminating element.

* * * * *